(12) United States Patent
Hatada et al.

(10) Patent No.: US 10,841,531 B2
(45) Date of Patent: Nov. 17, 2020

(54) DISPLAY CONTROL APPARATUS AND DISPLAY CONTROL METHOD

(71) Applicant: FUJITSU LIMITED, Kawasaki-shi, Kanagawa (JP)

(72) Inventors: Koki Hatada, Kawasaki (JP); Junichi Yura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/654,382

(22) Filed: Oct. 16, 2019

(65) Prior Publication Data

US 2020/0128210 A1 Apr. 23, 2020

(30) Foreign Application Priority Data

Oct. 18, 2018 (JP) .................................. 2018-196720

(51) Int. Cl.
| | |
|---|---|
| *H04N 7/14* | (2006.01) |
| *G06F 3/14* | (2006.01) |
| *H04L 29/06* | (2006.01) |
| *H04L 29/08* | (2006.01) |

(52) U.S. Cl.
CPC .............. *H04N 7/147* (2013.01); *G06F 3/14* (2013.01); *H04L 65/403* (2013.01); *H04L 67/306* (2013.01)

(58) Field of Classification Search
CPC ........... H04N 7/14; H04L 29/08; H04L 29/06; G06F 3/14

USPC ............. 348/14.01–14.16; 709/204; 715/753
See application file for complete search history.

(56) References Cited

U.S. PATENT DOCUMENTS

| | | | |
|---|---|---|---|
| 2013/0129252 A1 | 5/2013 | Lauper et al. | |
| 2013/0141517 A1* | 6/2013 | Shen ....................... | H04N 7/15 348/14.03 |
| 2014/0327677 A1 | 11/2014 | Walker | |
| 2014/0375750 A1 | 12/2014 | Yoshida | |
| 2015/0109100 A1* | 4/2015 | Naidoo ............ | G08B 13/19669 340/5.6 |
| 2017/0302708 A1* | 10/2017 | Thomas ................ | H04L 65/403 |
| 2019/0068661 A1* | 2/2019 | Masi .................... | H04L 65/4015 |

FOREIGN PATENT DOCUMENTS

| | | |
|---|---|---|
| JP | 2006-344205 | 12/2006 |
| JP | 2015-008381 | 1/2015 |
| JP | 2015-505384 | 2/2015 |
| JP | 2015-513129 | 4/2015 |

* cited by examiner

*Primary Examiner* — Melur Ramakrishnaiah
(74) *Attorney, Agent, or Firm* — Fujitsu Patent Center

(57) ABSTRACT

A display control apparatus includes a memory and a processor configured to transmit screen data generated based on data to a display apparatus in response to receiving a display request of the data from a request source having authority for accessing the data, and perform transmission, to a first terminal, a screenshot of at least a part of the screen data and information indicating the authority for accessing the data in response to receiving an instruction to transmit the screenshot to the first terminal.

13 Claims, 12 Drawing Sheets

| DATA NAME | ACCESS TOKEN | EXPIRATION DATE | THE NUMBER OF TIMES OF USE |
|---|---|---|---|
| A | ad8jit0ee53xn0pl | 2018/8/20 | 3 |
| B | adner43ol6kmm1rt | 2018/8/31 | 3 |
| C | 4jr98vissswt34b0 | null | 5 |
| ⋮ | ⋮ | ⋮ | ⋮ |

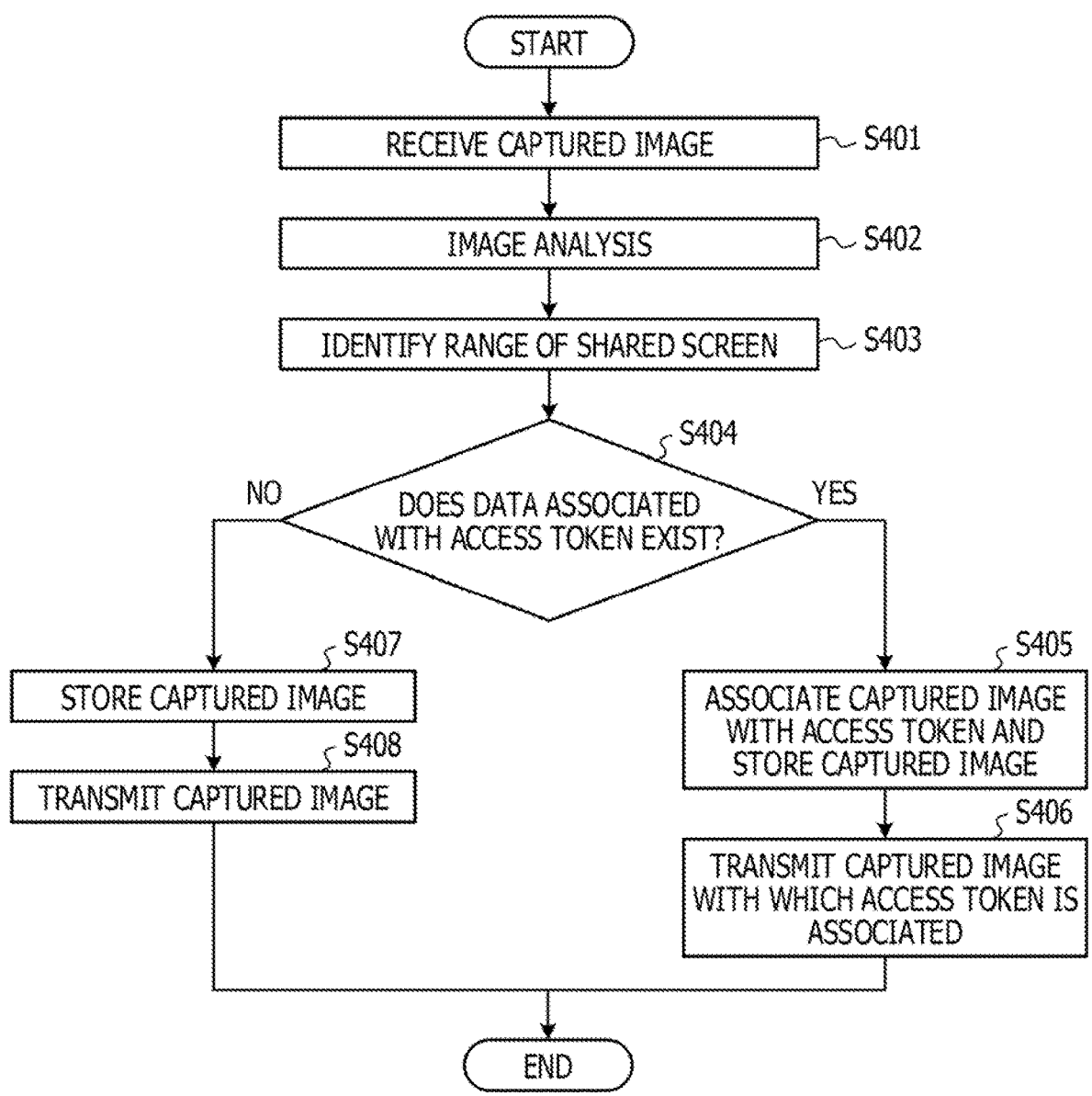

DISPLAY CONTROL APPARATUS AND DISPLAY CONTROL METHOD

CROSS-REFERENCE TO RELATED APPLICATION

This application is based upon and claims the benefit of priority of the prior Japanese Patent Application No. 2018-196720, filed on Oct. 18, 2018, the entire contents of which are incorporated herein by reference.

FIELD

The embodiment discussed herein is related to a display control technique.

BACKGROUND

In a meeting or the like, plural participants may make a discussion while viewing the same screen by bringing each one's terminal and transmitting a display screen from the terminal to a shared display.

In the middle of the meeting, when the participants share an item to be discussed or the like, an instruction to generate a screenshot of the screen of the shared display is made by operation in the terminal and the generated screenshot is transmitted to each terminal in some cases.

For example, a related art is disclosed in Japanese Laid-open Patent Publication No. 2015-008381.

SUMMARY

According to an aspect of the embodiment, a display control apparatus includes a memory and a processor configured to transmit screen data generated based on data to a display apparatus in response to receiving a display request of the data from a request source having authority for accessing the data, and perform transmission, to a first terminal, a screenshot of at least a part of the screen data and information indicating the authority for accessing the data in response to receiving an instruction to transmit the screenshot to the first terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating one example of an access token management table;

FIG. 12 is a flowchart illustrating one example of screenshot generation procedure of management apparatus.

DESCRIPTION OF EMBODIMENT

The sharing of a screenshot as in the related art is beneficial in terms of understanding of the gist of the item to be discussed. However, in the case of checking the contents of data that is the basis of an image included in the screenshot, the screenshot is merely image information and is insufficient. For example, if an image corresponding to a specific page of a document file is included in the screenshot, it is difficult to check other pages of the document file with only the screenshot.

Moreover, if access limitation is set for data, access authority is not given through mere sharing of the screenshot and therefore the participant is incapable of accessing the data although being a participant who may share the screenshot. Therefore, there is a technical problem that responding such as separately changing the access authority is forced in order to allow the participant who shares the screenshot to access the data and inconvenience exists with the existing computer system.

An embodiment will be described in detail below with reference to the drawings. Each kind of processing in the embodiment may be changed as appropriate. In all drawings for explaining the embodiment, the same part is given the same numeral in principle and repetitive description thereof is omitted.

Figure 1:
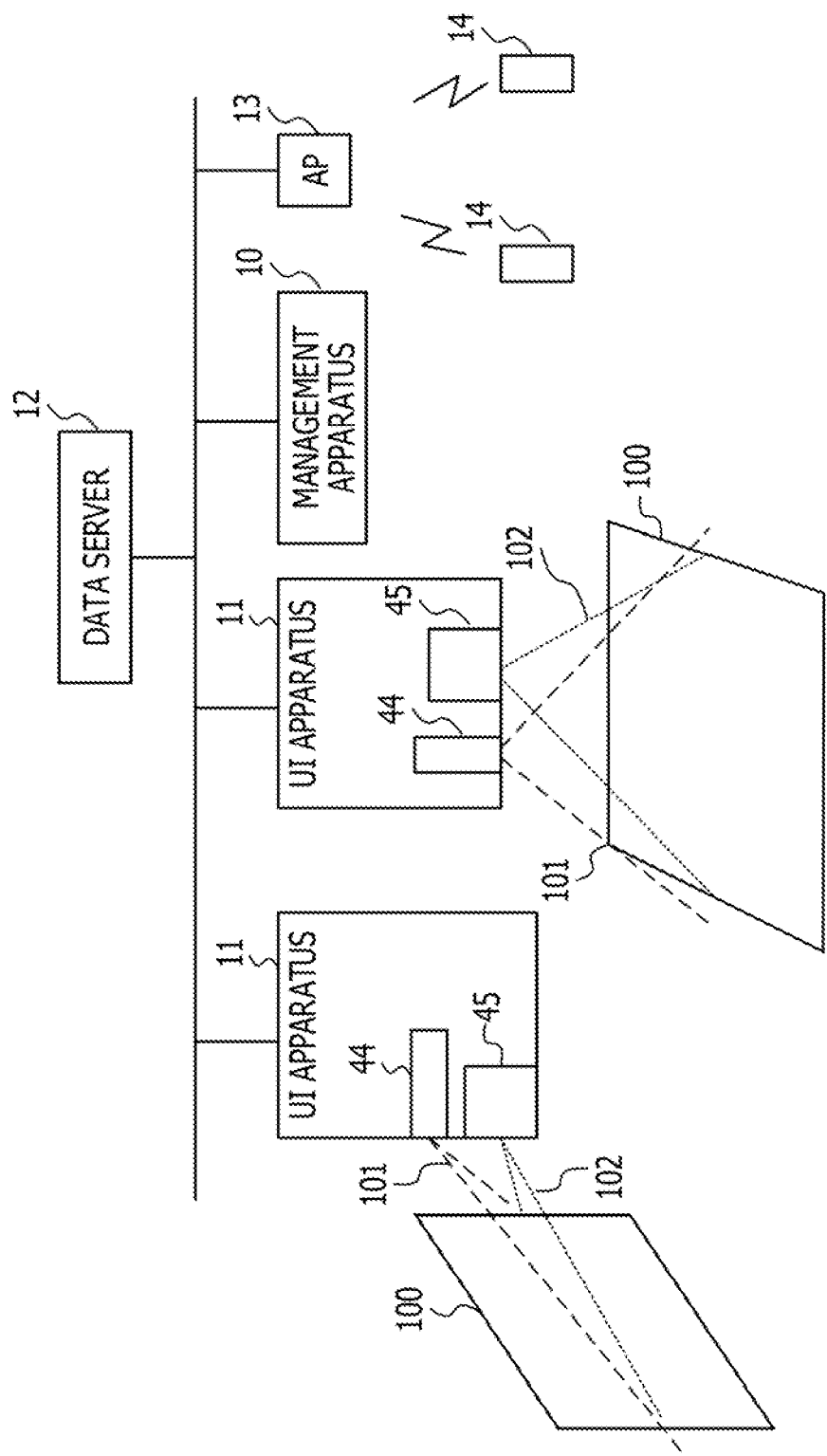
FIG. 1 is a diagram illustrating a system configuration example of a data sharing system.

FIG. 1 is a diagram illustrating a system configuration example of a data sharing system according to the embodiment. The data sharing system includes management apparatus 10, pieces of user interface (UI) apparatus 11, a data server 12, an access point 13, and terminals 14 and the respective pieces of equipment are coupled by a local area network (LAN), for example. The numbers of respective pieces of equipment that configure the data sharing system illustrated in FIG. 1 are one example and are not limited thereto. For example, the number of pieces of UI apparatus 11 may be one and plural data servers 12 may be included.

The management apparatus 10 controls operation of the data sharing system based on communication with each piece of equipment, for example. In the present embodiment, the management apparatus 10 is one example of display control apparatus.

The UI apparatus 11 includes imaging apparatus 44 and projecting apparatus 45, for example. A shared screen 100 is generated through projection of an image onto a wall, desk, or the like by the projecting apparatus 45, for example. Dotted lines 101 in FIG. 1 represent the imaging range of the imaging apparatus 44. Dotted lines 102 in FIG. 1 represent the projection range of the projecting apparatus 45. The imaging apparatus 44 and the projecting apparatus 45 are set in such a manner that the imaging range of the imaging apparatus 44 and the projection range of the projecting apparatus 45 overlap.

The data server 12 is a shared server used by plural users and holds data of each user and provides data in response to an instruction from the management apparatus 10 or the terminal 14, for example. The data server 12 may accept setting of access limitation of each user and carry out the access limitation in accordance with the setting. For example, when access from another piece of equipment to data is made, the data server 12 may determine whether or not the access to this data is possible according to whether or not the data server 12 has received information (access token) that proves having access authority issued to valid equipment in advance from the equipment of the access source.

A specific example of the access token is authentication information issued in order to identify the user who has been authenticated by the data server 12 and is a character string with a given length, for example. The access token is composed of 16-digit random alphanumeric characters, for example.

In another example, information that represents the type of data may be included in the access token. In this case, the management apparatus 10 and the terminal 14 may identify an application desired for viewing and editing of the data based on the information that represents the type of data in the access token. Therefore, the management apparatus 10 may identify the desired application before acquisition of the data and therefore prepare the application desired for viewing and editing of the data in advance.

For example, when accepting a request for display of a document file from the terminal 14, the management apparatus 10 identifies an application desired for execution of this document file based on the information that represents the type of data in the access token. If the application desired for execution (processing of opening) of the document file is not installed, the management apparatus 10 may acquire the desired application through the Internet. Although the document file is cited as one example as the kind of data, the data is not limited thereto. For example, the data may be another type of file such as diagram or image (including moving image).

In another example, information that represents the storing place of data may be included in the access token. For example, if plural data servers 12 exist, the management apparatus 10 and the terminal 14 may identify the data server 12 of the access destination based on the information that represents the storing place of data included in the access token.

The access point 13 is wireless equipment that mutually couples wired LAN and wireless LAN. For example, the access point 13 is coupled to the management apparatus 10 by the wired LAN and is coupled to the terminals 14 by the wireless LAN and relays communication between the management apparatus 10 and the terminal 14.

The terminal 14 is a computer such as a personal computer, smartphone, or tablet terminal possessed by a user, for example. The terminal 14 may have a wireless communication function and communicate with the management apparatus 10 through the access point 13, for example. An application for using the data sharing system is installed on the terminal 14, for example.

The user activates the application at the time of start of use of the data sharing system and undergoes user authentication such as password authentication, fingerprint authentication, or vein authentication, for example. After the authentication, for example, the user may cause user's data managed by the data server 12 to be displayed on the shared screen 100 by using the application of the terminal 14 in order to allow other uses to share information.

For example, when the user operates the terminal 14 and selects data to be displayed on the shared screen 100, a display request of the selected data is transmitted to the management apparatus 10 by the application. The management apparatus 10 transmits a display command to the UI apparatus 11 and causes the data to be displayed on the shared screen 100 in accordance with the accepted display request. For example, an image generated based on the data (for example, document file) is included in the shared screen 100.

Figure 2:
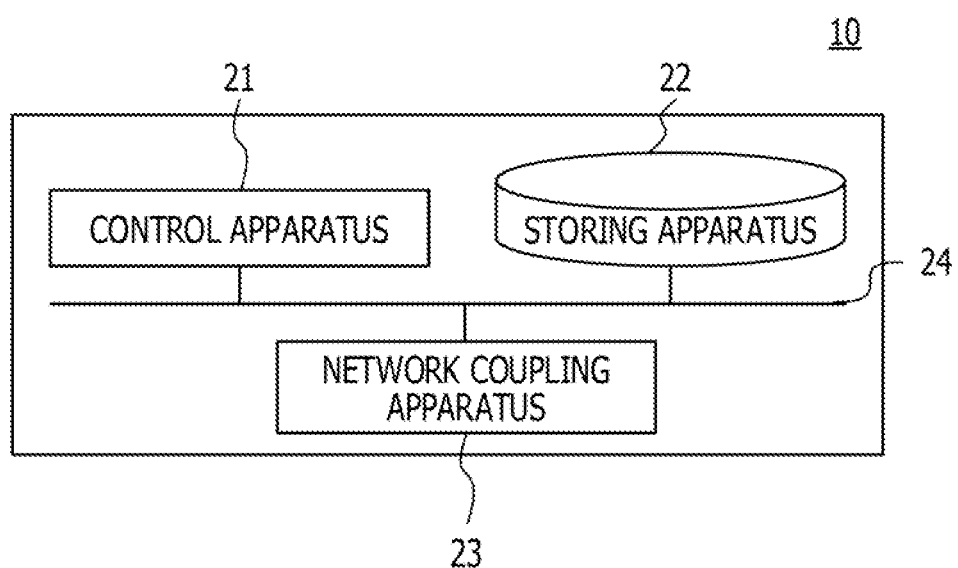
FIG. 2 is a diagram illustrating one example of a hardware configuration of management apparatus.

FIG. 2 is a diagram illustrating a hardware configuration example of the management apparatus 10 according to the embodiment. The management apparatus 10 includes control apparatus 21, storing apparatus 22, and network coupling apparatus 23 and they are coupled via a system bus 24 in such a manner as to be capable of inputting and outputting signals to and from each other.

The control apparatus 21 is apparatus that controls the management apparatus 10. The control apparatus 21 may be one or plural electronic circuits such as central processing unit (CPU), micro processing unit (MPU), graphics processing unit (GPU), digital signal processor (DSP), application specific integrated circuit (ASIC), and programmable logic device (PLD) and may be a combination of them, for example. The control apparatus 21 controls operation of the management apparatus 10, such as various kinds of arithmetic operation and data input and output with the respective pieces of hardware, and executes various kinds of processing based on an OS and various programs stored in the storing apparatus 22. Various kinds of information and so forth desired in the execution of a program may be acquired from the storing apparatus 22, for example. Part of the processing executed by the control apparatus 21 may be implemented by using dedicated hardware.

The control apparatus 21 executes data sharing processing according to the embodiment based on the data sharing program according to the embodiment. Furthermore, the number of pieces of control apparatus 21 is not limited to one and plural pieces of control apparatus 21 may be included in the management apparatus 10. In this case, plural pieces of control apparatus 21 execute the data sharing processing according to the embodiment in a dividing manner in some cases. Moreover, part of the data sharing processing according to the embodiment may be assigned to the UI apparatus 11 and the data server 12.

The storing apparatus 22 stores a program relating to the data sharing processing according to the embodiment, for example. The storing apparatus 22 may include main storing apparatus and auxiliary storing apparatus. The main storing apparatus temporarily stores at least part of the operating system (OS) and program which the control apparatus 21 is caused to execute, for example. Furthermore, the main storing apparatus stores various kinds of data desired for processing by the control apparatus 21. As the main storing apparatus, a random access memory (RAM) or the like may be used, for example.

The auxiliary storing apparatus may carry out reading of various kinds of stored information and writing of information based on an instruction from the control apparatus 21. As the auxiliary storing apparatus, a storage such as a hard disk drive (HDD), solid state drive (SSD), or flash memory may be used, for example. The auxiliary storing apparatus may store information used in the data sharing processing according to the embodiment and the result of the processing. Furthermore, the main storing apparatus and the auxiliary storing apparatus may assume each other's functions.

The network coupling apparatus 23 is an interface that carries out transmission and reception of signals in communication with the respective pieces of equipment coupled through a LAN, for example.

Specific operation of the management apparatus 10 will be exemplified below. For example, when accepting a display request of data including specifying information of the data and an access token from the terminal 14, the control apparatus 21 of the management apparatus 10 acquires the specified data from the data server 12 by using the access token. The control apparatus 21 transmits, to the UI apparatus 11, a command to display the acquired data in a region allocated to this terminal 14 in the shared screen 100. Therefore, it is possible for the management apparatus 10 to acquire data managed for each user in the data server 12 by using the access token and display the data on the shared screen 100. The control apparatus 21 may store display position information that represents the display position on the shared screen 100 regarding each piece of displayed data in the storing apparatus 22, for example. The display position may be identified based on coordinates defined by regarding a given point on the shared screen 100 as the origin, for example.

For example, when accepting an instruction of screenshot generation including specifying of a specific range in the shared screen 100, the control apparatus 21 generates a screenshot of the specific range. Moreover, the control apparatus 21 identifies data (for example, document file) that is the basis of an image included in the screenshot based on the display position information stored in the storing apparatus 22 and identifies the access token associated with the identified data. The instruction to generate a screenshot may be input by specific input operation (for example, gesture or the like) of the user to the shared screen 100, for example. In another example, the instruction to generate a screenshot may be transmitted from the terminal 14 to the management apparatus 10 in response to specific operation to the terminal 14.

For example, if at least part of an image generated based on any piece of data is included in a screenshot, the control apparatus 21 may determine that the image of this data is included in the screenshot. For example, if the whole of an image of any piece of data or a given ratio or higher of the image is included in a screenshot, the control apparatus 21 may determine that the image of this data is included in the screenshot.

The control apparatus 21 associates the generated screenshot with the identified access token and stores the screenshot in the storing apparatus 22. The control apparatus 21 transmits the screenshot with which the access token is associated to the specified terminal 14, for example. If the instruction to generate a screenshot is transmitted from the terminal 14, the control apparatus 21 may transmit the screenshot with which the access token is associated to the terminal 14 that has transmitted the instruction.

The terminal 14 (for example, terminal specified as the transmission destination of the screenshot or terminal that has transmitted the instruction to generate the screenshot) may access the data that is the basis of the image included in the screenshot by using the access token associated with the screenshot received from the management apparatus 10. Therefore, the user may view (depending on the access authority, including also editing and update for example) this data by the terminal 14. For example, the user may execute the processing using the data that is the basis of the image displayed on the shared screen 100, which is difficult to achieve by merely acquiring the screenshot.

As the method for associating the screenshot with the access token, the control apparatus 21 may transmit the screenshot in the formant of the exchange image file format (Exif) to which the access token is added, for example. As another method, the control apparatus 21 may use digital watermarking for the screenshot and embed the access token therein. Furthermore, for example when transmitting the access token to the terminal 14 separately from the screenshot, the control apparatus 21 may associate a hash value of the screenshot with the access token and transmit them to the terminal 14. This allows the terminal 14 to calculate the hash value about the received screenshot and identify the access token associated with the calculated hash value. In this case, for example, even when receiving plural screenshots, the terminal 14 may identify the access token associated with each screenshot. It may be said that the screenshot and the access token are transmitted to the terminal 14 in all of the methods exemplified above.

Furthermore, if images corresponding to plural pieces of data are included in a screenshot, the control apparatus 21 may associate the position information on the screenshot regarding the image corresponding to each of the plural pieces of data with an access token. In this case, the management apparatus 10 may associate the screenshot, the access token, and the position information and transmit them to the terminal 14.

Figure 3:
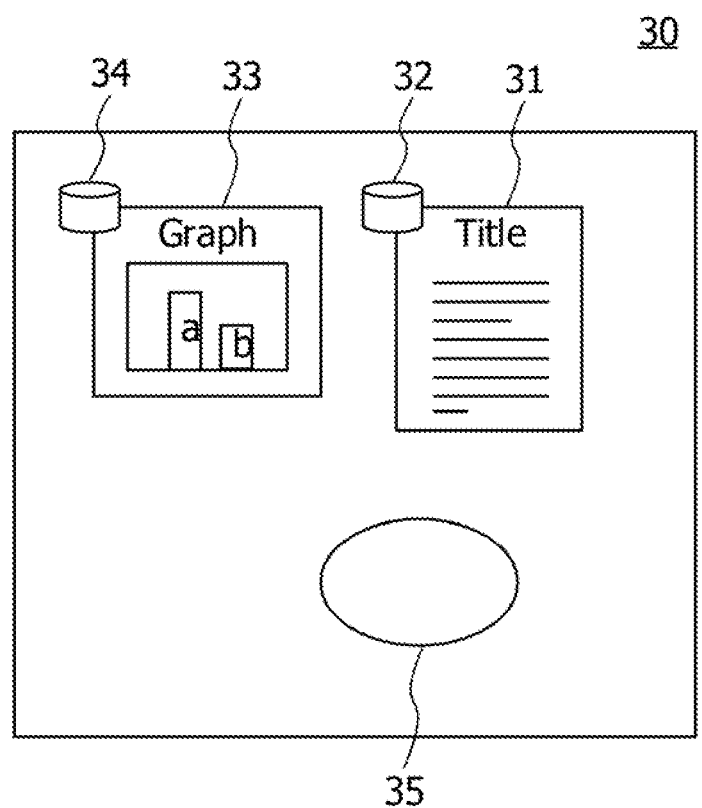
FIG. 3 is a diagram illustrating one example of a screenshot to which icons are added.

Moreover, the control apparatus 21 of the management apparatus 10 may add an icon onto a screenshot in association with an image that is included in the screenshot and corresponds to each of plural pieces of data with which an access token is associated. FIG. 3 is a diagram illustrating one example of a screenshot to which icons are added. In a screenshot 30, an icon 32 is added in association with an image 31 corresponding to data with which an access token is associated and an icon 34 is added in association with an image 33 corresponding to data with which an access token is associated.

On the other hand, for example, an icon is not added to an image 35 corresponding to data with which an access token is not associated like data that is not data acquired from the data server 12 and is directly input to the shared screen 100 by a user.

Therefore, the terminal 14 may display the screenshot 30 in such a manner that the user may identify the image with which the access token is associated in the screenshot 30 according to whether or not the icon exists. For example, when accepting input operation to select the icon 32 from the user in displaying the screenshot 30, the terminal 14 may acquire the data corresponding to the image 31 from the data server 12 by using the access token associated with the image 31 associated with the selected icon 32.

Figure 4:
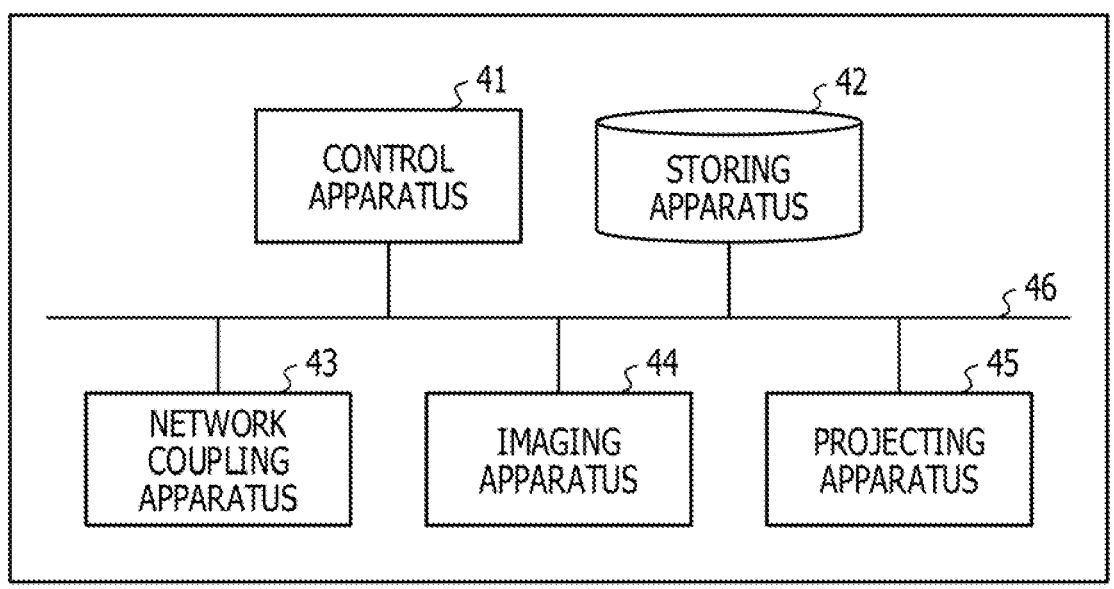
FIG. 4 is a diagram illustrating one example of a hardware configuration of UI apparatus.

FIG. 4 is a diagram illustrating a hardware configuration example of the UI apparatus 11 according to the embodiment. The UI apparatus 11 includes control apparatus 41, storing apparatus 42, network coupling apparatus 43, the imaging apparatus 44, and the projecting apparatus 45 and they are coupled via a system bus 46 in such a manner as to be capable of inputting and outputting signals to and from each other. Regarding each kind of apparatus, the number of pieces of apparatus is not limited to one and plural pieces of apparatus may exist. For example, plural pieces of imaging apparatus 44 and plural pieces of projecting apparatus 45 may be included. Furthermore, the UI apparatus 11 may include a liquid crystal display and a touch panel. Therefore, the UI apparatus 11 includes the touch panel instead of the imaging apparatus 44 and the projecting apparatus 45 in some cases, for example.

The control apparatus 41 is apparatus that controls the UI apparatus 11. The control apparatus 41 may be one or plural electronic circuits such as CPU, MPU, GPU, DSP, ASIC, and PLD and may be a combination of them, for example. The control apparatus 41 controls operation of the UI apparatus 11, such as various kinds of arithmetic operation and data input and output with the respective pieces of hardware, and executes various kinds of processing based on an OS and various programs stored in the storing apparatus 42. Various kinds of information and so forth desired in the execution of a program may be acquired from the storing apparatus 42, for example. Part of the processing executed by the control apparatus 41 may be implemented by using dedicated hardware. Furthermore, the number of pieces of control apparatus 41 is not limited to one and plural pieces of control apparatus 41 may be included in the UI apparatus 11.

The storing apparatus 42 stores a program relating to the data sharing processing according to the embodiment, for example. The storing apparatus 42 may include main storing apparatus and auxiliary storing apparatus. The main storing apparatus temporarily stores at least part of the OS and program which the control apparatus 41 is caused to execute, for example. Furthermore, the main storing apparatus stores various kinds of data desired for processing by the control apparatus 41. As the main storing apparatus, a RAM or the like may be used, for example.

The auxiliary storing apparatus may carry out reading of various kinds of stored information and writing of information based on an instruction from the control apparatus 41. As the auxiliary storing apparatus, a storage such as an HDD, SSD, or flash memory may be used, for example. The auxiliary storing apparatus may store information used in the data sharing processing according to the embodiment and the result of the processing. Furthermore, the main storing apparatus and the auxiliary storing apparatus may assume each other's functions.

The network coupling apparatus 43 is an interface that carries out transmission and reception of signals in communication with the respective pieces of equipment coupled through a LAN, for example.

The imaging apparatus 44 is a complementary metal oxide semiconductor (CMOS) camera or charge coupled device (CCD) camera, for example.

The projecting apparatus 45 is a projector of a liquid crystal display (LCD) system or a projector of a digital light processing (DLP) (registered trademark) system, for example.

Specific operation of the UI apparatus 11 will be exemplified below. The control apparatus 41 of the UI apparatus 11 projects the shared screen 100 by the projecting apparatus 45 in accordance with an instruction from the management apparatus 10, for example. The control apparatus 41 controls the imaging apparatus 44 in such a manner that the imaging apparatus 44 periodically carries out imaging at a given frame rate, for example. For example, as the frame rate, 24 frame per second (fps), 30 fps, 60 fps, and so forth are cited. However, the frame rate is not limited thereto. A captured image obtained by imaging by the imaging apparatus 44 is temporarily stored in the storing apparatus 42.

The control apparatus 41 detects input (for example, gesture) from a user based on the captured image obtained by imaging by the imaging apparatus 44 and executes processing according to the detected input, for example. The control apparatus 41 may change the displayed image according to detected input or transmit the detected input to the management apparatus 10, for example.

The explanation of generation of a screenshot relating to the shared screen 100 by the management apparatus 10 is described above. However, the configuration is not limited thereto and the control apparatus 41 that has detected input from a user may generate a screenshot. In this case, the control apparatus 41 may associate the generated screenshot with coordinate information of the screenshot in the shared screen 100 and transmit the screenshot to the management apparatus 10.

Figure 5:
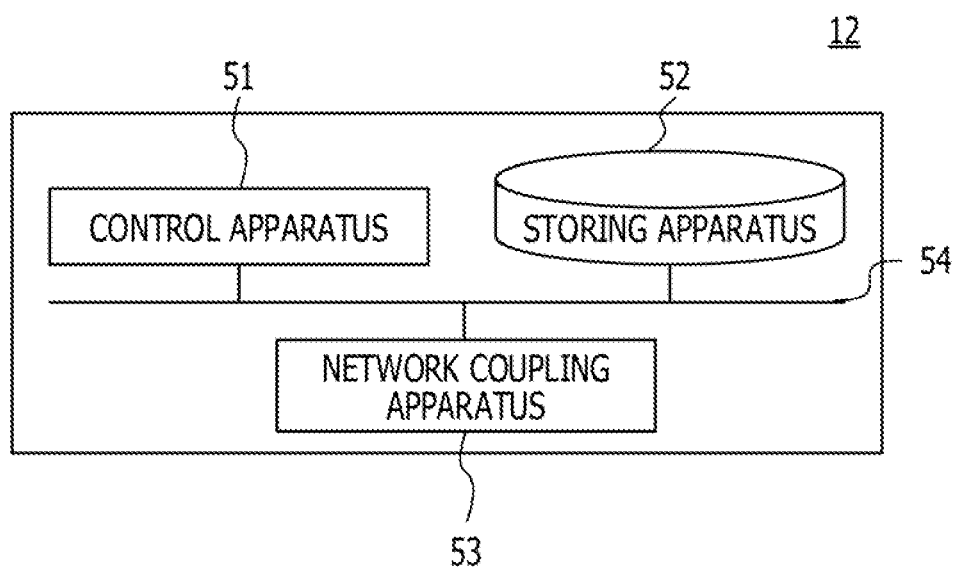
FIG. 5 is a diagram illustrating one example of a hardware configuration of a data server.

FIG. 5 is a diagram illustrating a hardware configuration example of the data server 12 according to the embodiment. The data server 12 includes control apparatus 51, storing apparatus 52, and network coupling apparatus 53 and they are coupled via a system bus 54 in such a manner as to be capable of inputting and outputting signals to and from each other.

The control apparatus 51 is apparatus that controls the data server 12. The control apparatus 51 may be one or plural electronic circuits such as CPU, MPU, GPU, DSP, ASIC, and PLD and may be a combination of them, for example. The control apparatus 51 controls operation of the data server 12, such as various kinds of arithmetic operation and data input and output with the respective pieces of hardware, and executes various kinds of processing based on an OS and various programs stored in the storing apparatus 52. Various kinds of information and so forth desired in the execution of a program may be acquired from the storing apparatus 52, for example. Part of the processing executed by the control apparatus 51 may be implemented by using dedicated hardware.

The storing apparatus 52 stores a program relating to the data sharing processing according to the embodiment, for example. The storing apparatus 52 may include main storing apparatus and auxiliary storing apparatus. The main storing apparatus temporarily stores at least part of the OS and program which the control apparatus 51 is caused to execute, for example. Furthermore, the main storing apparatus stores various kinds of data desired for processing by the control apparatus 51. As the main storing apparatus, a RAM or the like may be used, for example.

The auxiliary storing apparatus may carry out reading of various kinds of stored information and writing of information based on an instruction from the control apparatus 51. As the auxiliary storing apparatus, a storage such as an HDD, SSD, or flash memory may be used, for example. The auxiliary storing apparatus may store information used in the data sharing processing according to the embodiment and the result of the processing. Furthermore, the main storing apparatus and the auxiliary storing apparatus may assume each other's functions.

The network coupling apparatus 53 is an interface that carries out transmission and reception of signals in communication with the respective pieces of equipment coupled through a LAN, for example.

Specific operation of the data server 12 will be exemplified below. The control apparatus 51 of the data server 12 issues an access token in response to authentication of the terminal 14 and transmits the access token to the terminal 14, for example. The control apparatus 51 may issue the access token for each user or may issue the access token for each piece of data of the user.

For example, when accepting an acquisition request including specifying information of data and an access token from the management apparatus 10 or the terminal 14, the control apparatus 51 of the data server 12 transmits specified data to the management apparatus 10 or the terminal 14 of the request source (allows the data to be downloaded) if the access token is proper.

Figure 6:
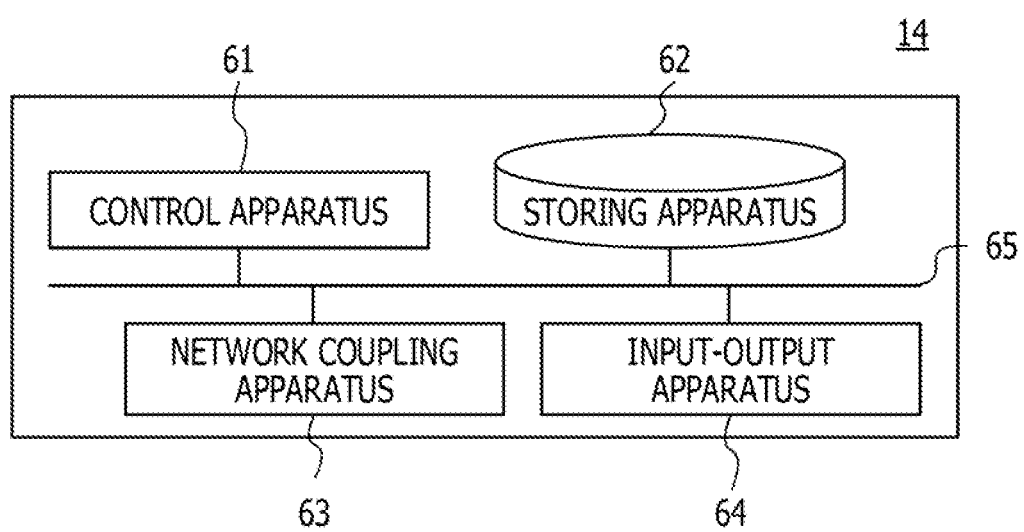
FIG. 6 is a diagram illustrating one example of a hardware configuration of a terminal.

FIG. 6 is a diagram illustrating a hardware configuration example of the terminal 14 according to the embodiment. The terminal 14 includes control apparatus 61, storing apparatus 62, network coupling apparatus 63, and input-output apparatus 64 and they are coupled via a system bus 65 in such a manner as to be capable of inputting and outputting signals to and from each other.

The control apparatus 61 is apparatus that controls the terminal 14. The control apparatus 61 may be one or plural electronic circuits such as CPU, MPU, and GPU and may be a combination of them, for example. The control apparatus 61 controls operation of the terminal 14, such as various kinds of arithmetic operation and data input and output with the respective pieces of hardware, and executes various kinds of processing based on an OS and various programs stored in the storing apparatus 62. Various kinds of information and so forth desired in the execution of a program may be acquired from the storing apparatus 62, for example. Part of the processing executed by the control apparatus 61 may be implemented by using dedicated hardware.

The storing apparatus 62 stores a program relating to the data sharing processing according to the embodiment, for example. The storing apparatus 62 may include main storing apparatus and auxiliary storing apparatus. The main storing apparatus temporarily stores at least part of the OS and program which the control apparatus 61 is caused to execute, for example. Furthermore, the main storing apparatus stores various kinds of data desired for processing by the control apparatus 61. As the main storing apparatus, a RAM or the like may be used, for example.

The auxiliary storing apparatus may carry out reading of various kinds of stored information and writing of information based on an instruction from the control apparatus 61. As the auxiliary storing apparatus, a storage such as an HDD, SSD, flash memory, or attachable/detachable recording medium may be used, for example. The auxiliary storing apparatus may store information used in the data sharing processing according to the embodiment and the result of the processing. Furthermore, the main storing apparatus and the auxiliary storing apparatus may assume each other's functions.

The network coupling apparatus 63 is an interface that carries out transmission and reception of signals in communication with the respective pieces of equipment coupled through a LAN, for example.

The input-output apparatus 64 may be a liquid crystal display, touch panel, keyboard, mouse, or a combination of them, for example. The input-output apparatus 64 accepts input according to operation of a user, for example.

Specific operation of the terminal 14 will be exemplified below. The control apparatus 61 of the terminal 14 receives an access token from the data server 12 in response to user authentication, for example. The control apparatus 61 transmits a display request including specifying information of data and the access token to the management apparatus 10 in response to operation of the user.

Furthermore, for example, another terminal 14 receives a screenshot with which an access token is associated from the management apparatus 10. In this case, the control apparatus 61 of the other terminal 14 may acquire data included in the screenshot as an image from the data server 12 by using the access token associated with the screenshot. Therefore, the other terminal 14 may acquire the data of another user managed in the data server 12 based on the screenshot and the access token provided from the management apparatus 10.

Figure 7:
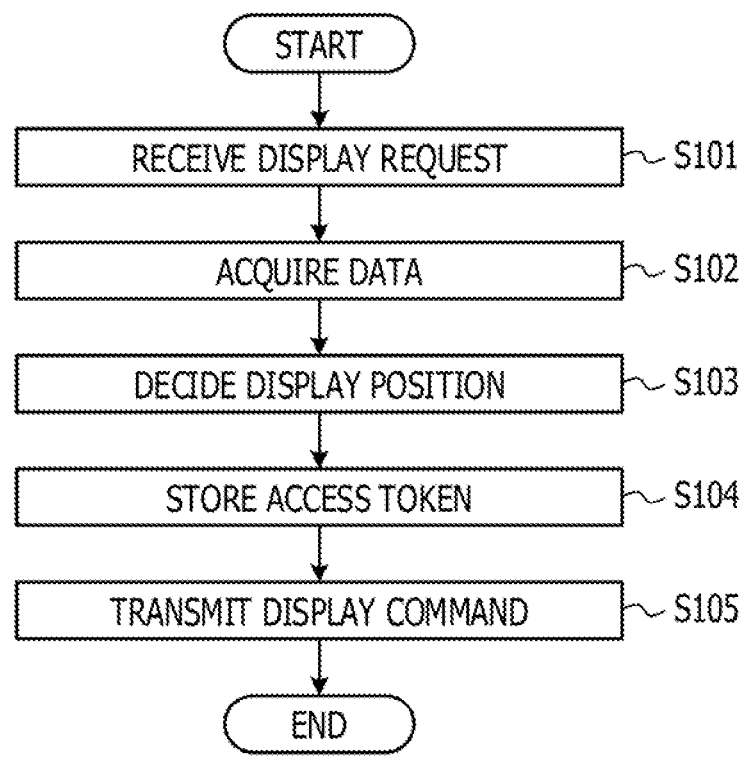
FIG. 7 is a flowchart illustrating one example of display processing procedure of management apparatus.

Next, one example of display processing procedure of the management apparatus 10 according to the embodiment will be described. FIG. 7 is a flowchart illustrating the one example of the display processing procedure of the management apparatus 10.

For example, the control apparatus 21 of the management apparatus 10 receives, from the terminal 14, a display request including information to specify data and an access token issued by the data server 12 (S101). The control apparatus 21 acquires the specified data from the data server 12 by using the access token included in the received display request (S102).

The control apparatus 21 decides the display position of the specified data in the shared screen 100 (S103). The control apparatus 21 associates display position information that represents the decided display position with the access token and stores the access token in the storing apparatus 22 (S104). The control apparatus 21 transmits a command to display the data at the decided display position to the UI apparatus 11 (S105).

Figure 8:
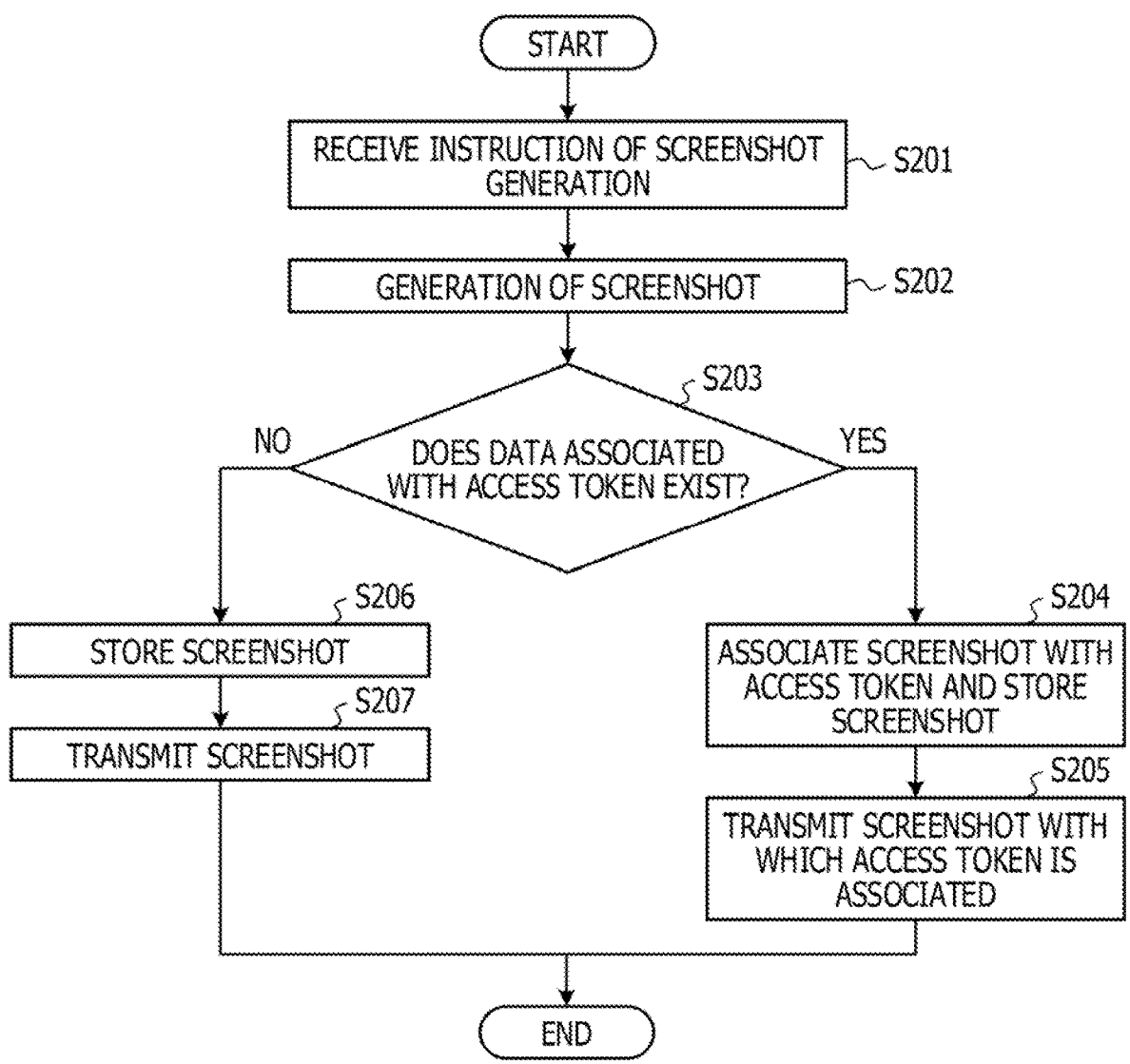
FIG. 8 is a flowchart illustrating one example of screenshot generation procedure of management apparatus.

Next, one example of screenshot generation procedure of the management apparatus 10 according to the embodiment will be described. FIG. 8 is a flowchart illustrating the one example of the screenshot generation procedure of the management apparatus 10.

For example, the control apparatus 21 of the management apparatus 10 accepts an instruction of screenshot generation including specifying of a specific range of the shared screen 100 (S201). The control apparatus 21 generates a screenshot of the part corresponding to the specific range in the shared screen 100 based on the coordinate information of the specified specific range (S202). The control apparatus 21 determines whether an image of data with which an access token is associated is included in the generated screenshot based on the coordinate information of the specified specific range (S203). For example, the control apparatus 21 refers to the display position information stored in the storing apparatus 22 in S104 and carries out the determination of S203.

If an image of data with which an access token is associated is included (Yes of S203), the control apparatus 21 associates the generated screenshot with the access token of the data that is the basis of the image included in the screenshot and stores the screenshot in the storing apparatus 22 (S204). The control apparatus 21 transmits the screenshot with which the access token is associated to the specified terminal 14 (S205). If the transmission destination is not specified, the control apparatus 21 may end the processing of the screenshot generation without executing the processing of S205.

If an image of data with which an access token is associated is not included (No of S203), the control apparatus 21 stores the generated screenshot in the storing apparatus 22 (S206). The control apparatus 21 transmits the screenshot to the specified terminal 14 (S207). If the transmission destination is not specified, the control apparatus 21 may end the processing of the screenshot generation without executing the processing of S207.

From the above, the management apparatus 10 according to the embodiment may receive an access token from the terminal 14 and acquire data from the data server 12 by using the access token and display an image of the data on the shared screen 100, for example. The management apparatus 10 may associate a generated screenshot with the access token of data that is the basis of an image included in this screenshot and transmit the access token and the screenshot to the terminal 14, for example. Therefore, the terminal 14 may acquire the data that is the basis of the image included in the screenshot from the data server 12 by using the associated access token.

According to the data sharing system in accordance with the embodiment, for example, when data of a first user is displayed on the shared screen 100 in a meeting, a screenshot including an image generated based on the data of the first user and an access token may be transmitted to the terminal 14 of a second user. This allows the second user to acquire the data of the first user and carry out viewing and editing in the terminal 14. For example, the terminal 14 of the second user is given access authority by receiving the access token.

The screenshot is beneficial in terms of sharing the gist of an item to be discussed in a meeting, and furthermore associating the access token allows the user to view and edit data in the terminal 14 according as appropriate. On the other hand, in the method in which data is transmitted to the terminal 14 originally without using the screenshot and the access token, the management apparatus 10 is desired to transmit the data with a comparatively large volume to the terminal 14 irrespective of whether the data is viewed and edited in the terminal 14. Therefore, the method using the screenshot and the access token according to the present embodiment has a technical effect of reducing the transmission volume between the management apparatus 10 and the terminal 14.

In the present embodiment, the example is cited in which the management apparatus 10 generates a screenshot based on an instruction from a user. However, the configuration is not limited thereto. For example, the management apparatus 10 may generate a screenshot of the whole of the shared screen 100 periodically (for example, every five minutes) without accepting operation of a user. In this case, every time the management apparatus 10 generates the screenshot, the management apparatus 10 may execute processing of associating with an access token and store the screenshot associated with the access token in the storing apparatus 22.

In the present embodiment, the example is cited in which access authority is given to the terminal 14 by transmitting an access token to the terminal 14 of the target of transmission of a screenshot. However, the configuration is not limited thereto. For example, instead of transmitting an access token to the terminal 14, the management apparatus 10 may transmit, to the data server 12, a command to execute processing of giving the access authority to the terminal 14 to which a screenshot is transmitted. For example, when receiving this command, the data server 12 may change the setting of limitation of access to data that is the basis of an image included in the screenshot and allow access to the data from the terminal 14 to which the screenshot has been transmitted.

Next, modification example 1 of the embodiment will be described. In modification example 1, the same part as the embodiment is given the same numeral and description thereof is partly omitted. In modification example 1, by setting use conditions for the access token, use of the access token in the terminal 14 that has received a screenshot with which this access token is associated is controlled.

The management apparatus 10 according to modification example 1 may transmit a request for issuance of an access token for which the use conditions are set to the data server 12 in generation of a screenshot. The use conditions are the expiration date, the number of times of use, and so forth of the access token. The management apparatus 10 associates the access token that is issued by the data server 12 and for which the use conditions are set with the screenshot and stores them in the storing apparatus 22. The management apparatus 10 may cause the use conditions input from a user to be included in the request for issuance of an access token in the generation of the screenshot.

In another example, the management apparatus 10 may transmit a request for issuance of an access token for which the use conditions are set to the data server 12 when accepting an instruction to transmit a screenshot to the terminal 14. The management apparatus 10 associates the access token for which the use conditions are set with the screenshot and transmits them to the terminal 14.

In modification example 1, the data server 12 may set the use conditions such as the expiration date and the number of times of use (it may be the number of terminals 14 that is available) for an access token when issuing the access token in response to a request from the management apparatus 10. For example, if the expiration date is set for the access token, the terminal 14 may use this access token only before the set expiration date to acquire data from the data server 12. For example, if the number of times of use is set for the access token, the terminal 14 may use this access token only the set number of times of use to acquire data from the data server 12.

FIG. 9 is a diagram illustrating one example of an access token management table. An access token management table 90 is stored in the storing apparatus 52 of the data server 12. For example, when accepting a request for issuance of an access token from the management apparatus 10, the control apparatus 51 of the data server 12 issues the access token of data and stores the use expiration and the number of times of use of this access token in the access token management table 90. The data server 12 may set only one use condition in the use conditions for each access token and does not have to set all of the use conditions. If the data server 12 does not set the use condition, the data server 12 may store null in the corresponding column in the access token management table 90.

The data server 12 may use the expiration date and the number of times of use specified in a request for issuance of an access token from the management apparatus 10 regarding the use conditions of the access token. In another example, the data server 12 may use the use conditions decided for each user in advance.

For example, when accepting a request for access to data by use of an access token from the terminal 14, the control apparatus 51 of the data server 12 refers to the access token management table 90 and permits access to the data (acquisition) if the access request satisfies the associated use conditions. The data server 12 may carry out update in such a manner as to decrease, by one, the value stored in the column of the number of times of use in the access token management table 90 every time access to the data is made by using the access token. Thereby, the data server 12 may count the number of times of access to the data. The count of the number of times of use may be carried out for each user and control may be carried out in such a manner that data may be accessed the number of times equivalent to the number of times of use set in the use conditions for each user.

Figure 10:
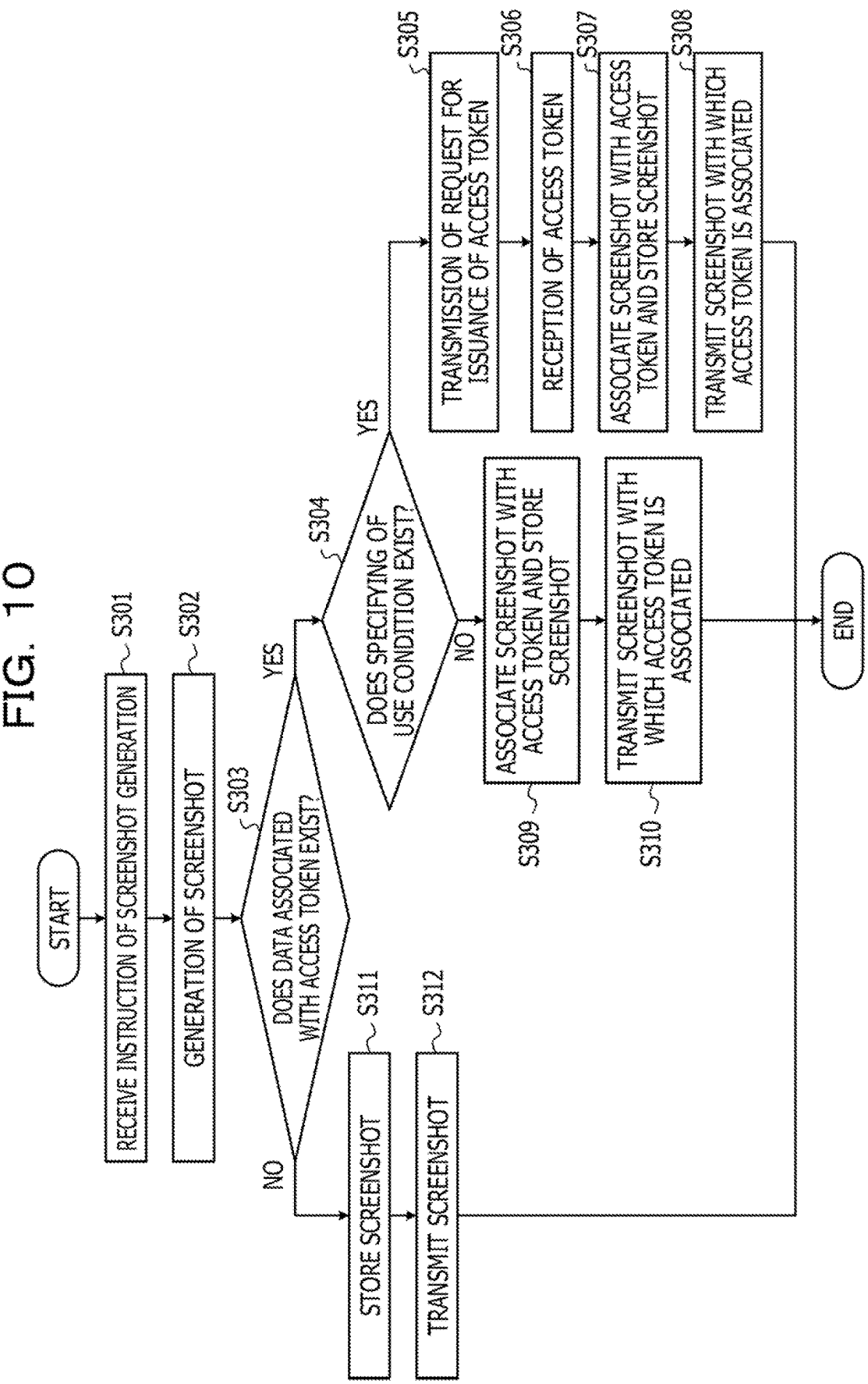
FIG. 10 is a flowchart illustrating one example of screenshot generation procedure of management apparatus.

Next, one example of screenshot generation procedure of the management apparatus 10 according to modification example 1 will be described. FIG. 10 is a flowchart illustrating the one example of the screenshot generation procedure of the management apparatus 10.

For example, the control apparatus 21 of the management apparatus 10 accepts an instruction of screenshot generation including specifying of a specific range of the shared screen 100 (S301). The control apparatus 21 generates a screenshot of the part corresponding to the specific range in the shared screen 100 based on the coordinate information of the specified specific range (S302). The control apparatus 21 determines whether an image of data with which an access token is associated is included in the generated screenshot based on the coordinate information of the specified specific range (S303).

If an image of data with which an access token is associated is included (Yes of S303), the control apparatus 21 determines whether or not input to specify the use condition exists (S304).

If specifying of the use condition exists (Yes of S304), the control apparatus 21 transmits a request for issuance of an access token including the specified use condition to the data server 12 (S305). The control apparatus 21 receives the access token for which the use condition is set from the data server 12 (S306). The control apparatus 21 associates the generated screenshot with the access token for which the use condition is set regarding the data that is the basis of the image included in the screenshot and stores the screenshot in the storing apparatus 22 (S307). The control apparatus 21 transmits the screenshot with which the access token for which the use condition is set is associated to the specified terminal 14 (S308). If the transmission destination is not specified, the control apparatus 21 may end the processing of the screenshot generation without executing the processing of S308.

If specifying of the use condition does not exist (No of S304), the control apparatus 21 associates the generated screenshot with the access token of the data that is the basis of the image included in the screenshot and stores the screenshot in the storing apparatus 22 (S309). The control apparatus 21 transmits the screenshot with which the access token is associated to the specified terminal 14 (S310). If the transmission destination is not specified, the control apparatus 21 may end the processing of the screenshot generation without executing the processing of S310.

If an image of data with which an access token is associated is not included (No of S303), the control apparatus 21 stores the generated screenshot in the storing apparatus 22 (S311). The control apparatus 21 transmits the screenshot to the specified terminal 14 (S312). If the transmission destination is not specified, the control apparatus 21 may end the processing of the screenshot generation without executing the processing of S312.

From the above, in generating a screenshot, the management apparatus 10 according to modification example 1 may carry out switching between generation of a screenshot with which an access token for which the use condition is set is associated and generation of a screenshot with which an access token for which the use condition is not set is associated according to whether or not input of the use condition exists.

The management apparatus 10 according to modification example 1 may associate another access token for which the use condition is set for each screenshot. Therefore, for example, even with plural screenshots including the same data as an image, the management apparatus 10 may associate another access token for which the use condition is set. In this case, in the access token management table 90, plural records in which different access tokens are stored may be included for the same data and the use condition may be individually stored in each of the plural records.

This may generate the screenshot with which the access token for which the use condition is individually set is associated. Thus, use of the access token in the terminal 14 to which the screenshot has been transmitted may be limited according to the intention of the user of the data sharing system.

For example, in the case in which three users are participating in a meeting using the data sharing system, if the number of times of use of an access token is set to two times, the set number of times of use is consumed when two users who participate in the meeting access data of the remaining user by the terminal 14 by using the access token. Therefore, even if a screenshot with which this access token is associated falls into the hands of a third party that did not participate in the meeting for some reason, it is difficult for the third party to access the data by using the access token.

The management apparatus 10 may transmit a request for issuance of an access token for which the use condition is set to the data server 12 when generating a screenshot and also when transmitting a screenshot to the specified terminal 14. This allows the management apparatus 10 to transmit a screenshot with which another access token for which the use condition is set is associated for each terminal 14.

Next, modification example 2 of the embodiment will be described. In modification example 2, the same part as the embodiment is given the same numeral and description thereof is partly omitted. In modification example 2, the terminal 14 executes part of processing of generation of a screenshot of the shared screen 100.

Figure 11:
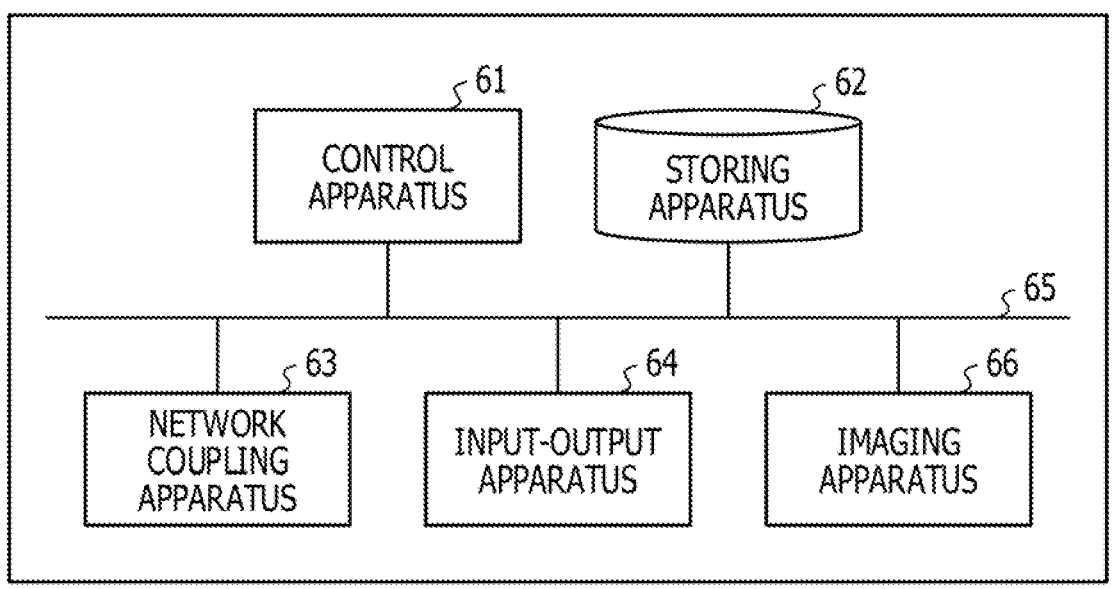
FIG. 11 is a diagram illustrating one example of a hardware configuration of a terminal.

FIG. 11 is a diagram illustrating a hardware configuration example of the terminal 14 according to modification example 2. The terminal 14 includes control apparatus 61, storing apparatus 62, network coupling apparatus 63, input-output apparatus 64, and imaging apparatus 66 and they are coupled via a system bus 65 in such a manner as to be capable of inputting and outputting signals to and from each other.

The imaging apparatus 66 is a CMOS camera or CCD camera, for example.

In modification example 2, the control apparatus 61 of the terminal 14 generates a captured image including at least part of the shared screen 100 by using the imaging apparatus 66 in response to operation of a user, for example. The control apparatus 61 transmits the captured image to the management apparatus 10 as a screenshot of the shared screen 100. In modification example 2, the captured image including at least part of the shared screen 100 is one example of the screenshot.

The management apparatus 10 according to modification example 2 has a function of identifying the range included in the captured image in the shared screen 100 by carrying out image analysis of the captured image received from the terminal 14, for example. For the method of the image analysis, an existing technique may be used. For example, the management apparatus 10 may extract feature points through the image analysis of the captured image and identify the range (coordinate information) of the shared screen 100 included in the captured image based on comparison with feature points of the present shared screen 100.

The management apparatus 10 may identify data that is included in the captured image as an image and is displayed in the shared screen 100 based on the identified range and the display position information that represents the display position of the data and identify the access token associated with the displayed data. The management apparatus 10 may associate the identified access token with the captured image and transmit them to the terminal 14.

The terminal 14 that has generated the captured image and the terminal 14 to which the captured image with which the access token is associated is transmitted may be the same terminal 14 or may be different terminals 14. The management apparatus 10 may automatically decide the terminal 14 that is the transmission source of the captured image as the transmission destination of the captured image with which the access token is associated.

Next, one example of screenshot generation procedure of the management apparatus 10 according to modification example 2 will be described. FIG. 12 is a flowchart illustrating the one example of the screenshot generation procedure of the management apparatus 10.

For example, the control apparatus 21 of the management apparatus 10 receives a captured image obtained by imaging the shared screen 100 from the terminal 14 (S401). The control apparatus 21 carries out image analysis about each of the received captured image and the present shared screen 100 and extracts feature points (S402). The control apparatus 21 identifies the coordinate information of the range of the shared screen 100 included in the captured image based on the feature points of the captured image and the feature points of the present shared screen 100 (S403). The control apparatus 21 determines whether an image of data with which an access token is associated is included in the captured image based on the identified coordinate information and the display position information (S404).

If an image of data with which an access token is associated is included (Yes of S404), the control apparatus 21 associates the captured image with the access token of the data that is the basis of the image included in the captured image and stores the captured image in the storing apparatus 22 as a screenshot (S405). The control apparatus 21 transmits the captured image with which the access token is associated to the specified terminal 14 (S406). If the transmission destination is not specified, the control apparatus 21 may end the processing of the screenshot generation without executing the processing of S406.

If an image of data with which an access token is associated is not included (No of S404), the control apparatus 21 stores the captured image in the storing apparatus 22 as a screenshot (S407). The control apparatus 21 transmits the captured image to the specified terminal 14 (S408). If the transmission destination is not specified, the control apparatus 21 may end the processing of the screenshot generation without executing the processing of S408.

According to modification example 2, the screenshot associated with the access token is generated in the management apparatus 10 based on a captured image obtained by imaging by the terminal 14. Therefore, for example, when desiring to acquire the access token of data of another person displayed on the shared screen 100, a user may acquire the access token by imaging this data of another person by the terminal 14 and transmitting the captured image to the management apparatus 10.

The processing functions of the respective pieces of apparatus in the above-described embodiment are implemented on a computer through execution, by the computer, of a program including plural commands in which the processing contents of functions desired to be possessed by the respective pieces of apparatus are described. The program including the plural commands in which the processing contents are described may be recorded on a computer-readable recording medium. As examples of the computer-readable recording medium, there are magnetic storing apparatus, optical disc, magneto-optical recording medium, semiconductor memory, and so forth. As examples of the magnetic storing apparatus, HDD, flexible disc, magnetic tape, and so forth are cited. As examples of the optical disc, digital versatile disc (DVD), DVD-RAM, compact disc-read only memory (CD-ROM), CD-R (recordable)/RW (rewritable), and so forth are cited.

In the case of distributing the program, a portable recording medium such as a DVD or CD-ROM on which the program is recorded is sold, for example. Furthermore, it is also possible that a server computer stores the program in a storage medium in advance and transfers the program to another computer through a network.

The computer that executes the program stores the program recorded on the portable recording medium or the program transferred from the server computer in its own storing apparatus, for example. Then, the computer may read the program from its own storing apparatus and execute processing in accordance with the program. The computer may directly read the program from the portable recording medium and execute processing in accordance with the program. Furthermore, every time a program is transferred from a server computer coupled via a network, the computer may execute processing in accordance with the received program sequentially.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A display control apparatus comprising:
a memory; and
a processor coupled to the memory and the processor configured to:
transmit screen data generated based on data to a display apparatus in response to receiving a display request of the data from a request source having authority for accessing the data,
generate a screenshot of at least a part of the screen data in response to receiving an instruction to transmit the screenshot to a first terminal, and
when the screenshot includes an image data associated with an access token configured with a character string to identify an authenticated user, perform transmission, to the first terminal, the screenshot and information indicating the authority for accessing the data.

2. The display control apparatus according to claim 1, wherein
the screen data includes image data corresponding to the data,
the processor is configured to determine, based on a position of the image data in the screen data, whether the screenshot includes the image data,
the transmission of the screenshot and the information is performed when it is determined that the screenshot includes the image data, and
the processor is configured to, when it is determined that the screenshot does not include the image data, transmit, to the first terminal, the screenshot without the information in response to receiving the instruction.

3. The display control apparatus according to claim 1, wherein the processor is configured to:
transmit a request for issuing the information to a server apparatus that stores the data, and
receive the information from the server apparatus.

4. The display control apparatus according to claim 3, wherein
a use condition of the information is included in the request, and
the authority indicated by the information is limited by the use condition.

5. The display control apparatus according to claim 3, wherein
the server apparatus is configured to determine whether access of the first terminal to the data is permitted, based on the information included in an access request in response to receiving the access request from the first terminal.

6. The display control apparatus according to claim 1, wherein
the processor is configured to generate the screenshot in response to receiving a generation request including an image that is generated by capturing a screen of the display apparatus and includes at least a part of the screen data.

7. A computer-implemented display control method comprising:
transmitting screen data generated based on data to a display apparatus in response to receiving a display request of the data from a request source having authority for accessing the data;
generate a screenshot of at least a part of the screen data in response to receiving an instruction to transmit the screenshot to a first terminal, and
when the screenshot includes an image data associated with an access token configured with a character string to identify an authenticated user transmitting, to the first terminal, the screenshot and information indicating the authority for accessing the data.

8. The display control method according to claim 7, wherein
the screen data includes image data corresponding to the data,
the display control method further comprises determining, based on a position of the image data in the screen data, whether the screenshot includes the image data,
the transmitting of the screenshot and the information is performed when it is determined that the screenshot includes the image data, and
the display control method further comprises, when it is determined that the screenshot does not include the image data, transmit, to the first terminal, the screenshot without the information in response to receiving the instruction.

9. The display control method according to claim 7, further comprising:
transmitting a request for issuing the information to a server apparatus that stores the data; and
receiving the information from the server apparatus.

10. The display control method according to claim 9, wherein
a use condition of the information is included in the request, and
the authority indicated by the information is limited by the use condition.

11. The display control method according to claim 9, wherein
the server apparatus is configured to determine whether access of the first terminal to the data is permitted, based on the information included in an access request in response to receiving the access request from the first terminal.

12. The display control method according to claim 7, further comprising:
generating the screenshot in response to receiving a generation request including an image that is generated by capturing a screen of the display apparatus and includes at least a part of the screen data.

13. A non-transitory computer-readable medium storing instructions executable by one or more computers, the instructions comprising:
one or more instructions for transmitting screen data generated based on data to a display apparatus in response to receiving a display request of the data from a request source having the authority for accessing the data;
one or more instructions for generating a screenshot of at least a part of the screen data in response to receiving an instruction to transmit the screenshot to a first terminal, and
when the screenshot includes an image data associated with an access token configured with a character string to identify a authenticated user, one or more instructions for transmitting, to the first terminal, the screenshot and information indicating the authority for accessing the data.

* * * * *